April 22, 1924.
H. SALTMAN
SPEED GAUGE FOR MOTOR CARS
Filed Sept. 14, 1923
1,491,425
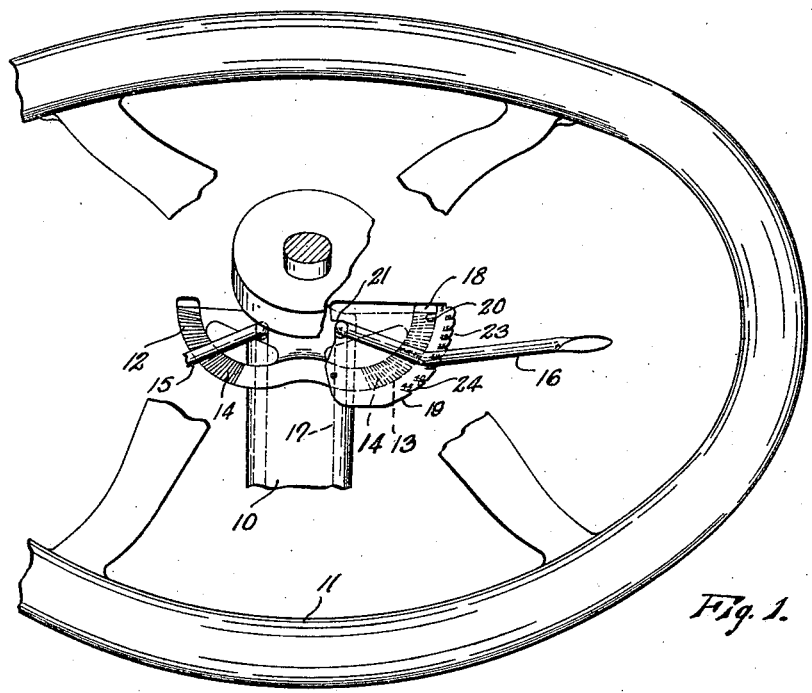
Fig. 1.
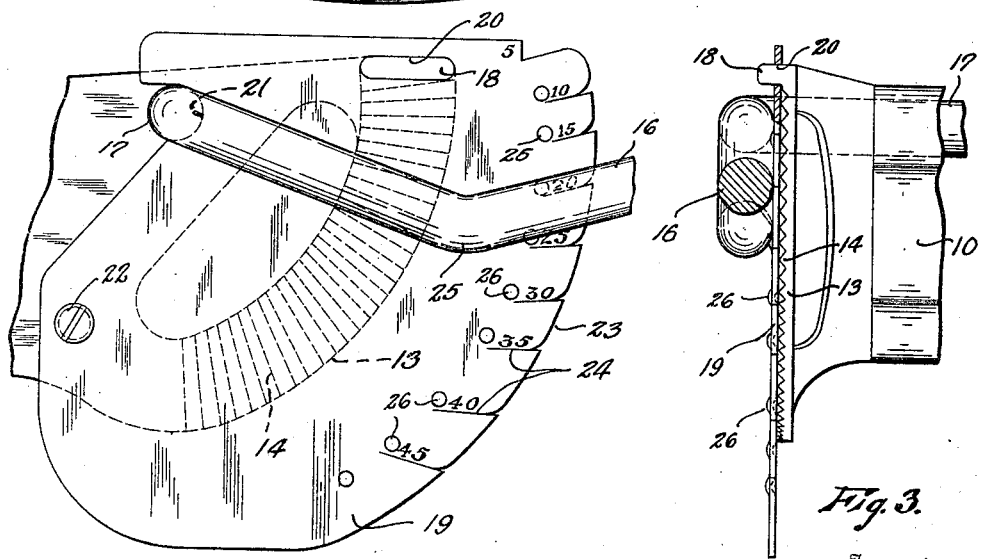
Fig. 2.
Fig. 3.
Inventor
Herman Saltman
By Wooster & Davis
Attorneys.

Patented Apr. 22, 1924.

1,491,425

UNITED STATES PATENT OFFICE.

HERMAN SALTMAN, OF BRIDGEPORT, CONNECTICUT.

SPEED GAUGE FOR MOTOR CARS.

Application filed September 14, 1923. Serial No. 662,594.

*To all whom it may concern:*

Be it known that I, HERMAN SALTMAN, a citizen of the United States, residing at Bridgeport, county of Fairfield, State of Connecticut, have invented a new and useful Speed Gauge for Motor Cars, of which the following is a specification.

This invention relates to a device for indicating the approximate speed of a motor car, and has for an object to provide a simple device having no movable elements which may be applied to the steering column of the car, and will indicate to the operator the approximate speed of the car in miles per hour for different positions of the throttle lever.

It is also an object of the invention to provide a device of this character which may be applied by the ordinary operator without requiring the employment of a skilled mechanic, and which may be manufactured and sold at low cost.

With the foregoing and other objects in view, I have devised the construction illustrated in the accompanying drawing forming a part of this specification, corresponding elements being indicated throughout the various views by similar reference characters. In this drawing, Fig. 1 is a perspective view of the top of a steering column and steering wheel with my improved device applied thereto, portions of the elements being broken away to more clearly show the construction.

Fig. 2 is a top plan view of the device in position, and

Fig. 3 is a side elevation thereof looking from the right of Fig. 2.

The steering column is indicated at 10, mounted at the upper end of which is the steering wheel 11. Carried by the column beneath the steering wheel are the usual quadrants 12 and 13 provided with ribs 14 on their upper faces to coact with the lower sides of the spark and throttle levers 15 and 16 respectively, to maintain them in different positions, the resiliency of these levers coacting with the notches to retain them in their adjusted positions, as is well-known. Connected with the throttle lever 16 in the column is the throttle rod 17 leading to the mechanism for operating the throttle valve, and the quadrant 13 is provided adjacent its upper end with an upwardly extending lug or rib 18 acting as a limit stop to limit the upward movement of the throttle lever. This is the well-known construction of the Ford steering and control mechanism.

In order to provide a simple device to indicate to the driver at a glance the approximate speed of the car for different positions of the throttle lever, I provide a plate 19 which is adapted to be mounted upon the quadrant 13 between this quadrant and the throttle lever 16. The plate is provided with an elongated opening 20 adapted to receive the upturned lug 18 and is also provided on its inner edge with a recess 21 adapted to receive the throttle rod 17 so that the rod will coact with the lug 18 to retain the plate in position. The pressure of the throttle lever 16 on the top of the plate, due to the resiliency of this lever, will also assist in retaining the plate in position and prevent accidental dislodgment thereof. This structure as disclosed will properly retain the plate in position, but if desired an additional screw 22 may be provided passing through the plate and threaded into the quadrant to hold the plate against any possibility of rattling. The outer edge 23 of the plate is curved as shown and is provided on the upper side thereof with a series of marks 24 properly spaced on the plate to indicate the approximate speed of the car when the throttle lever lies with its upper edge along the line, and the plate is so calibrated that these marks indicate the approximate speed of the car in miles per hour. The plate is preferably made of sufficient length that this curved edge 23 extends out beyond the quadrant 13 and the marks 24 are arranged to be substantially parallel with the side of the throttle lever beyond the bend 25. This gives more room for the figures, which may be made of sufficient size to be easily read at a glance, and also allows for more accurate calibration. The speeds indicated will, of course, not be accurate for all conditions of operation, as for instance, in going up different grades, but the plate can be calibrated to indicate the approximate speed in miles per hour which the car will normally attain with any given position of the throttle lever under ordinary running on fairly level roads.

If desired the plate may be provided with a series of low projections 26 struck up therefrom, or other suitable means, to retain the lever in different positions and prevent it from shifting under the jars incident to operation on the road.

It will be apparent that the device is extremely simple in construction and may be applied by the owner without requiring the services of a skilled mechanic. It will also be sufficiently accurate for ordinary operation, and does not have any moving elements to get out of order or need adjustment, such as is employed in the usual speedometers. This device besides being a great deal cheaper to manufacture and apply to the car than the usual speedometer, further has nothing to get out of order or need adjustment and so requires no expense for upkeep.

Having thus set forth the nature of my invention, what I claim is:

1. A speed indicating device for motor vehicles having a throttle lever and a quadrant cooperating therewith provided with an upturned stop lug comprising a graduated plate provided with an opening adapted to receive the upturned stop lug of the throttle lever quadrant, said plate being also provided with a recess in one edge to receive the throttle rod and adapted to rest on the quadrant between said quadrant and the throttle lever.

2. A speed indicating device for motor vehicles having a throttle lever and a quadrant cooperating therewith provided with an upturned stop lug comprising a graduated plate provided with an opening adapted to receive the upturned stop lug of the throttle lever quadrant, said plate being also provided with a recess in one edge to receive the throttle rod, a series of spaced projections extending upwardly from the top surface of said plate to act as retaining means for the throttle lever, said plate being adapted to rest on the top of the quadrant between the quadrant and the throttle lever.

3. In combination with the steering column of a motor car including a steering wheel, a throttle lever extending laterally from said column and a quadrant carried by the column beneath said lever provided with an upturned lug, of a plate mounted on said quadrant between the quadrant and the lever and provided with an opening to receive said lug, said plate being calibrated to indicate the approximate speed of the car for different positions of the throttle lever.

4. In combination with the steering column of a motor car including a steering wheel, a throttle lever extending laterally from said column and a quadrant carried by the column beneath said lever provided with an upturned lug, of a plate mounted on the quadrant between the quadrant and the lever and held against the quadrant by the resiliency of the lever, said plate being provided with an opening to receive said lug and calibrated to indicate the approximate speed of the car for different positions of the throttle lever.

5. In combination with the steering column of a motor car including a steering wheel, a throttle rod on the column, a throttle lever extending laterally from said rod and a quadrant carried by the column beneath said lever provided with an upturned lug, of a plate mounted on said quadrant between the quadrant and the lever and held against the quadrant by the resiliency of the lever, said plate being provided with an opening to receive said lug and a recess in one edge to receive the throttle rod, said plate being also calibrated to indicate the approximate speed of the car for different positions of the throttle lever.

6. A speed indicating device for motor vehicles having a throttle lever and a quadrant cooperating therewith provided with an upturned stop lug comprising a graduated plate provided with an opening adjacent one edge thereof adapted to receive the upturned stop lug of the throttle lever quadrant, said plate being adapted to rest on the top of said quadrant and between the quadrant and the throttle lever, and said plate being also provided with a series of spaced projections extending above the surface thereof adapted to coact with the throttle lever to hold it in adjusted positions.

In testimony whereof I affix my signature.

HERMAN SALTMAN.